United States Patent [19]

Schweizer

[11] 4,128,175

[45] Dec. 5, 1978

[54] STAND FOR HOLDING GRAMOPHONE RECORDS AND MAGNETIC TAPE CASSETTE CASES

[76] Inventor: Eduard H. Schweizer, 5101 Boarshead Rd., Minnetonka, Minn. 55343

[21] Appl. No.: 860,733

[22] Filed: Dec. 13, 1977

[30] Foreign Application Priority Data

Dec. 21, 1976 [CH] Switzerland ............... 16069/76

[51] Int. Cl.² ............................................. A47F 7/00
[52] U.S. Cl. ........................................... 211/40; 312/9; D6/185
[58] Field of Search ............ 211/40, 41; 206/387; D6/185; 312/9, 12

[56] References Cited

U.S. PATENT DOCUMENTS

| D. 160,015 | 9/1950 | Rauch et al. ............ 211/40 X |
| D. 231,063 | 4/1974 | Rafaat ....................... 211/40 UX |
| D. 234,066 | 1/1975 | Wallace ..................... D6/185 X |
| D. 243,647 | 3/1977 | Schoenfeld ............... D6/185 X |
| 2,297,081 | 9/1942 | Slough ....................... 211/40 |
| 2,825,465 | 3/1958 | Burgo ........................ 211/40 |
| 3,756,383 | 9/1973 | Kryter ....................... 206/387 X |
| 3,856,145 | 12/1974 | Bartholomew .......... 211/40 |
| 3,868,018 | 2/1975 | Thies ......................... 211/40 |
| 3,907,116 | 9/1975 | Wolf et al. ................ 211/40 |

Primary Examiner—Roy D. Frazier
Assistant Examiner—Robert W. Gibson, Jr.
Attorney, Agent, or Firm—Cushman, Darby & Cushman

[57] ABSTRACT

A stand which is capable of holding both gramophone records and magnetic tape cassette cases. The stand comprises a baseplate having side walls or other members projecting upwardly therefrom to define, with the top of the baseplate, gramophone record receiving compartments. The projecting members are so formed as to provide a stable support for the stand in an inverted position exposing the underside of the baseplate, cassette case holding means being provided on the thus exposed underside of the baseplate.

4 Claims, 4 Drawing Figures

STAND FOR HOLDING GRAMOPHONE RECORDS AND MAGNETIC TAPE CASSETTE CASES

The invention relates to a stand for holding gramophone records and magnetic tape cassette cases.

As is known, conventional stands for gramophone records are provided with compartments for housing such gramophone records. In addition, a number of structural types of cassette holders exist for storing magnetic tape cassettes stored in standardised cases. Owners of so-called audio equipment capable of playing both magnetic tape cassettes and gramophone records are obliged to purchase a separate stand for the storage of each type of sound recording medium. This type of storage is subject to the disadvantage that it takes up a great deal of space, quite apart from the fact that the purchasing costs are two-fold. On the other hand, storage problems can also arise for the dealer.

An object of the present invention is to provide one stand that can be used for the compact and inexpensive storage of gramophone records or tape cassettes in cases.

According to the invention there is provided a stand for holding gramophone records and/or magnetic tape cassette cases, such stand comprising a baseplate having an underside and an upper side, a plurality of projecting members lying in parallel planes extending perpendicularly from the upper side of the baseplate whereby when the stand is supported on the baseplate the projecting members, together with the upper side of the baseplate, define compartments for the receipt of gramophone records, and holding members provided on the underside of the baseplate for receiving magnetic tape cassette cases, the projecting members being adapted to support the stand in an inverted position to provide access to said holding members for the storage of magnetic tape cassette cases.

In a preferred embodiment a recess is formed on the underside of the baseplate and the holding members comprise ribs which divide the recess into rack compartments. Connecting means may be provided on the stand for assembly of the stand together side-by-side with an adjacent similar stand.

The invention will be further described, by way of example, with reference to the accompanying drawings, in which.

Figure 1:
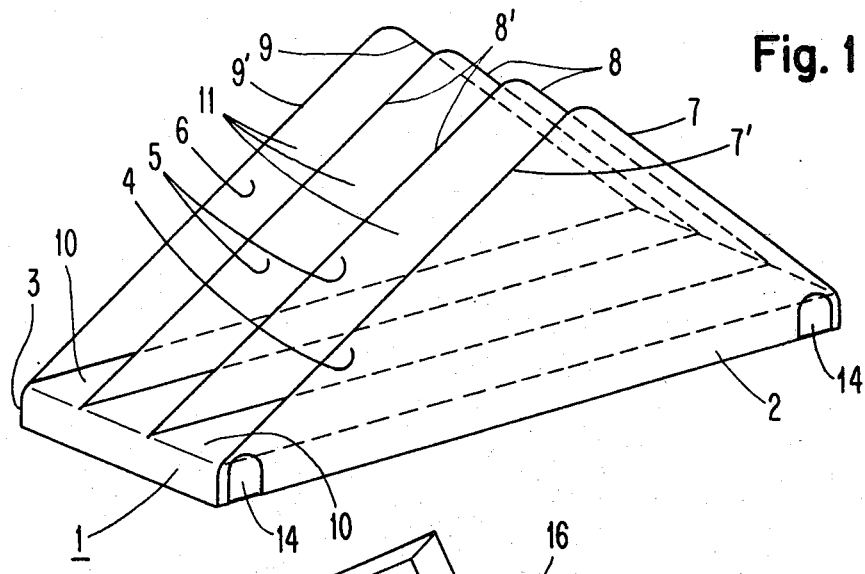
FIG. 1 is a simplified perspective representation of a stand embodying the invention set up in position as a holder for gramophone records.
Figure 2:
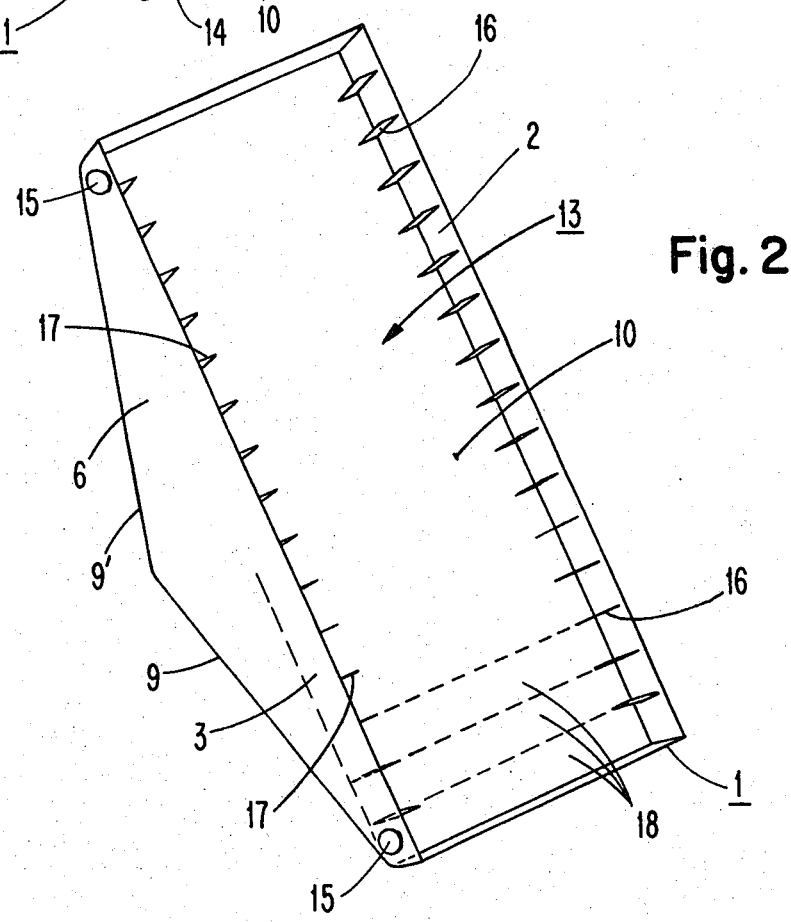
FIG. 2 is a simplified perspective representation of the stand of FIG. 1 set up in an inverted position as a holder for compact cassette cases.

FIGS. 1 and 2 illustrate a stand which comprises a rectangular flat baseplate 1, the longer narrow sides 2 and 3, of which are of approximately the same length as a conventional gramophone record sleeve. Extending perpendicularly from the underside of the base plate 1 are side walls 4 and 6, provided along the longitudinal sides 2 and 3, and two partition walls 5 parallel to and located between the side walls. All four walls 4, 5 and 6 are of equal size and, as illustrated, are in the form of obtuse-angled equilateral triangular projecting members having edges 7 and 7', 8 and 8' and 9 and 9' respectively which run in laterally reverse directions. As is known, side walls of this type, in the shape of triangles, support gramophone records leaning against them very effectively, although, of course, as explained further below, different shapes are also possible. The side walls 4 and 6 and the two partition walls 5, together with the actual base 10 of the baseplate 1 form compartments 11 for receiving gramophone records or gramophone record sleeves. When the stand is set up as illustrated in FIG. 1 for the receipt of records or record sleeves, the baseplate 1 serves as a supporting foot or base.

The illustrated stand can be used as a holder for compact cassette cases instead of for gramophone records, and is constructed accordingly. For this purpose, the congruent walls 4, 5 and 6 can be used as a second support with the holder partly inverted. The support is given by the edges 7, 8 and 9 or 7',8' and 9'. The second support enables the stand to be set up as shown in FIG. 2 in a position which is the inverse of that in FIG. 1. When the stand is set up in this inverse position, what was previously the underside of the baseplate 1 becomes readily accessible. A rectangular recess 13 is located in the underside of the baseplate 1 with the bottom of the recess 13 being formed by the rear side of the base 10 of the compartments 11. Laterally, the recess 13 is bordered by the narrow sides 2 and 3 of the baseplate 1, which project beyond the base 10.

The recess 13 provided in the underside of the baseplate 1 is designed to receive a plurality of cassette cases. For this purpose, matching ribs 16 and 17 are moulded onto the narrow sides 2 and 3 at equal intervals to project into the recess 13. The ribs 16 and 17 subdivide the recess 13 into a number of rack compartments 18 which, when of suitable dimensions with respect to a current standard size for cassette cases, form a holding device of precisely the right size for these cases. For example, the rack compartments 18 illustrated have internal dimensions to enable compact cassette cases standardised by the PHILIPS system to be pushed in.

Advantageously, several stands can be assembled together with their side walls 4 and 6 arranged side-by-side to give a single unit. For this purpose, one narrow side 2 has, on the outside, a deepened annular groove 14 at each end. Shallow round heads 15 which have a dovetail section and are complementary to the grooves 14 and which can be locked into the grooves 14 of an adjacent similar stand are located on the other narrow side 3.

Thus, in accordance with the position in which it is set up, the stand described above can be employed either for supporting gramophone records or for holding cassettes and thus makes it superfluous to purchase or store separate holders or supports each capable of receiving records or cassettes only. The saving in space in the shop and at the place where the stand is set up by the user is correspondingly advantageous, quite apart from the saving in cost which results from the need to purchase only one standard type of stand for both storage functions. Furthermore, the stand can be manufactured in a very simple manner as a mass-produced article, for example as a single-piece injection moulding. Alternatively, the stand may be supplied, for example, as a flat-pack kit for assembly by the user.

It can also be seen from the above that it is essential, if the stand is to operate satisfactorily as a cassette holder, for the underside of the baseplate 1 to be accessible when the stand is positioned to hold cassette cases.

Accordingly, a second support providing a support plane may be required, the underside of the baseplate 1 being at an angle of less than 90° to the support plane. In any case, the centre of gravity when the stand is fully loaded with cassettes must be above this supporting surface.

In the illustrative embodiment according to FIGS. 1 and 2, solid side walls 4 and 6 are provided. However, these are merely special embodiments of the general side parts which may be used. The side parts can, for example, be designed as angled pieces, staves, struts and other shapes of projecting member as long as they lie in parallel planes to define compartments for gramophone records and also at the same time form a second support for setting up the stand in the inverted position.

With regard to the recess 13, the dimensions thereof and the subdivision thereof into rack compartments 18 can be in accordance with any desired alternative design. For example, the side walls 4 and 6 and, correspondingly, the narrow sides 2 and 3 can be at a distance corresponding to twice the length of a cassette, so that the recess 13 is suitable, after the installation of a central rib, for holding a double number of cassettes. An arrangement of rack compartments running in the longitudinal direction of the stand or of a frame which has adjustable subdividing strips and can be placed in the cavity is also conceivable.

The basic essential feature of the baseplate 1 is that it is provided with holding members for receiving cassette cases when the stand is in the inverse position. Accordingly, these holding members are not restricted to a cavity, subdivided into rack compartments by ribs, in the baseplate 1. On the contrary, for example, strips, angled pieces and the like projecting above the underside of the baseplate are also conceivable as holding members.

The invention can also be modified so that the second support provided for setting up the stand in the inverse cassette holding position not only provides a supporting surface but also has holding members for receiving cassette cases. A stand of this type would enable both gramophone records and cassettes to be held at the same time without inverse positioning of the stand being necessary.

Figure 3:
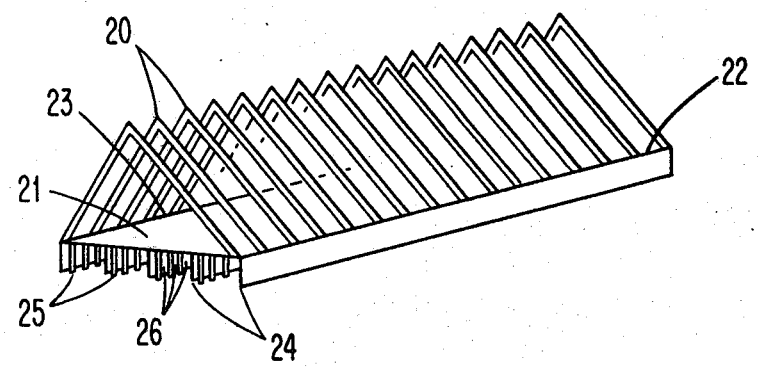
FIG. 3 is a perspective view of another embodiment of stand according to the invention.
Figure 4:
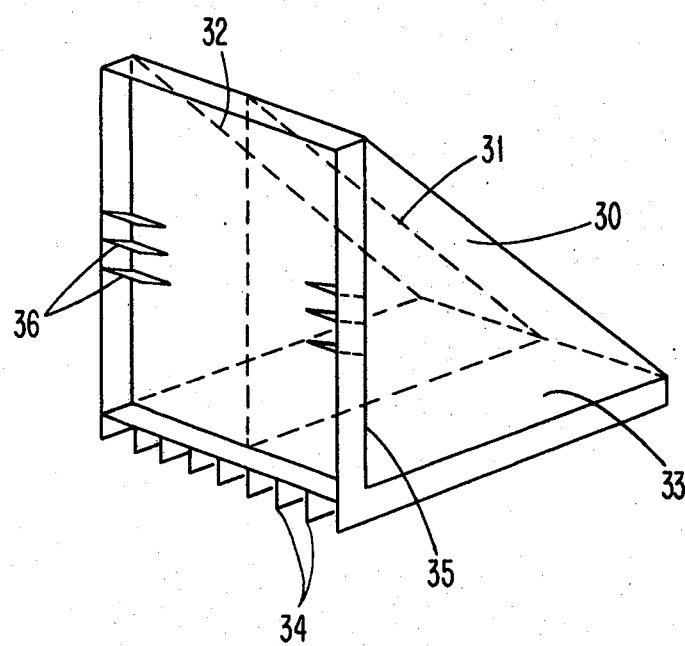
FIG. 4 is a perspective view of yet a further illustrative embodiment of stand embodying the invention.

Some possible modifications are illustrated and briefly explained in FIGS. 3 and 4. The embodiment of the stand illustrated in FIG. 3 has a large number of angled pieces 20 as side parts and these form rack compartments 27 for gramophone records and also together form a second support with two supporting planes. Five protruding rails 24 running parallel to the narrow sides 22 and 23 of the baseplate 21 are fixed below the baseplate 21. These rails 24 are provided with strips 25 which subdivide the space between the rails into rack compartments 26 for the receipt of cassettes.

In the illustrative embodiment of FIG. 4, the side parts are designed as right-angled side walls 30, 31 and 32, one leg of the right-angled triangle standing on the baseplate 33. The baseplate 33 has, on its underside, protruding strips 34 as holding members for cassette cases. The hypotenuse edges of the side walls 30–32 provide the necessary support when the stand is set up in its inverse cassette storing position. The edges of the side walls 30–32 which are perpendicular to the baseplate 33 are fastened to a back wall 35. The outside of this is also provided with a large number of holding members 36, only a few of which are indicated to give a clear overall view. The holding members 36 which are arranged on the back wall 35 and form rack compartments 37 thus enable cassette cases to be held independently of the position in which the holder is set up and, in particular, whilst gramophone records are held at the same time.

I claim:

1. A multi-purpose stand for alternative storage of gramophone records encased in rectangular envelopes and tape cassettes encased in rectangular storage boxes, said stand being adapted for standing in at least two different positions on a flat surface, comprising:
   a generally rectangular base plate provided with a plurality of parallel members projecting perpendicularly from one side of said base plate parallel to opposite edges thereof and defining together with said base plate one side compartment for the storage of gramophone records encased in rectangular envelopes when said stand is supported in a first position with said base plate one side up,
   at least a portion of the outer edges of two of said members being in a coplanar relation and arranged to rest on a flat surface for supporting said stand stably in a second position with the other side of said base plate up,
   said base plate being provided with at least a pair of like rails extending perpendicularly from said base plate other side along at least a pair of opposite edges thereof,
   the outer edges of said rails being in a coplanar relation and arranged to rest on a flat surface for supporting said stand stably in said first position with said base plate one side up,
   a plurality of rib means extending inwardly from said rails and defining therewith, together with said base plate other side, rack compartments for the storage of tape cassette boxes when said stand is supported in said second position with said base plate other side up.

2. A stand according to claim 1 wherein the portions of the outer edges of the two projecting members are disposed in a plane inclined at an angle of less than 90° to the base plate.

3. A stand according to claim 1 comprising two base plates arranged perpendicularly to each other and joined along substantially a common edge, each base plate being provided with rails and rib means to define rack compartments for the storage of tape cassette boxes.

4. A stand according to claim 1 wherein the two projecting members are in the shape of equilateral triangles whereby the stand may be supported in two different positions with the base plate other side up.

* * * * *